Figure 2:
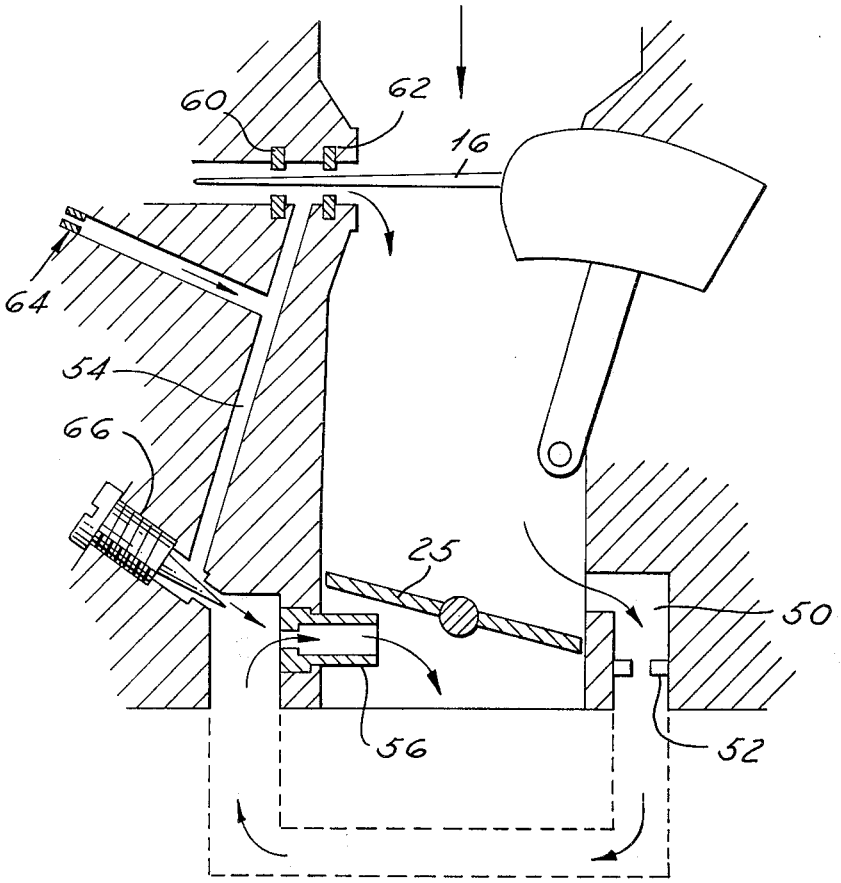

United States Defensive Publication [19] (H) [11] T962,010
Newbury et al. [43] Sept. 6, 1977

[54] VARIABLE VENTURI CARBURETOR IDLE SPEED FUEL CONTROL

[76] Inventors: Frank T. Newbury, Barnsfield, High Easter Road, Dunmow, Essex; Terence Inkpen, 7 Oakwood Court, Althorne, Chelmsford, Essex, both of England

[21] Appl. No.: 770,161

[22] Filed: Feb. 18, 1977

Related U.S. Application Data

[63] Continuation of Ser. No. 670,475, March 25, 1976, abandoned.

[51] Int. Cl.² ..... F02M 9/06

[52] U.S. Cl. ..... 261/41 D; 261/44 R; 261/DIG. 78

[57] ABSTRACT

A variable area venturi carburetor has a movable venturi wall with a fuel metering rod attached for cooperation with aligned main and auxiliary fuel jets located in an opening in the fixed venturi wall, a bypass passage connected between the jets siphoning or bleeding off fuel at closed throttle positions into a passage connected to the induction passage just below the closed position of the throttle valve, to prevent stalling of the engine by fuel flow into the main venturi at this time.

1 Claim, 2 Sheets Drawing,
12 Pages Specification

The file of this unexamined application may be inspected and copies thereof may be purchased (849 O.G. 1221, Apr. 9, 1968).

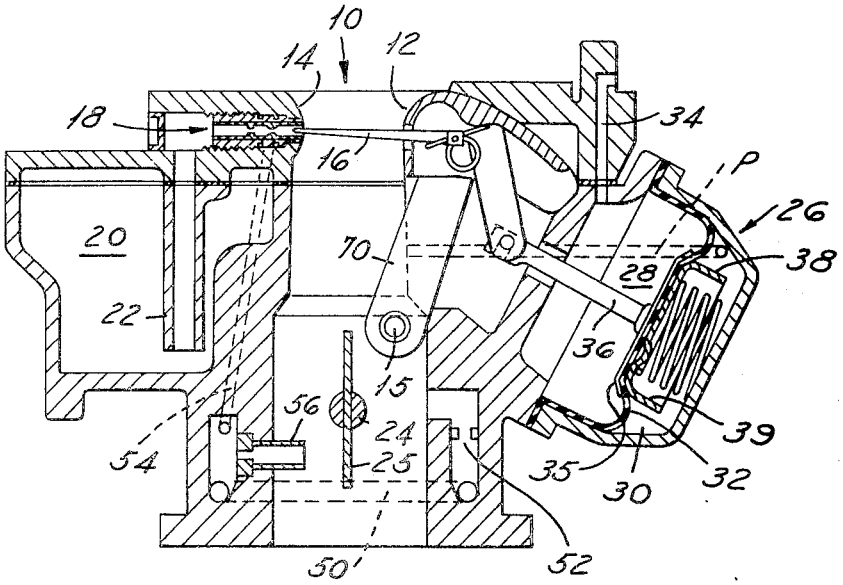

FIG. 1
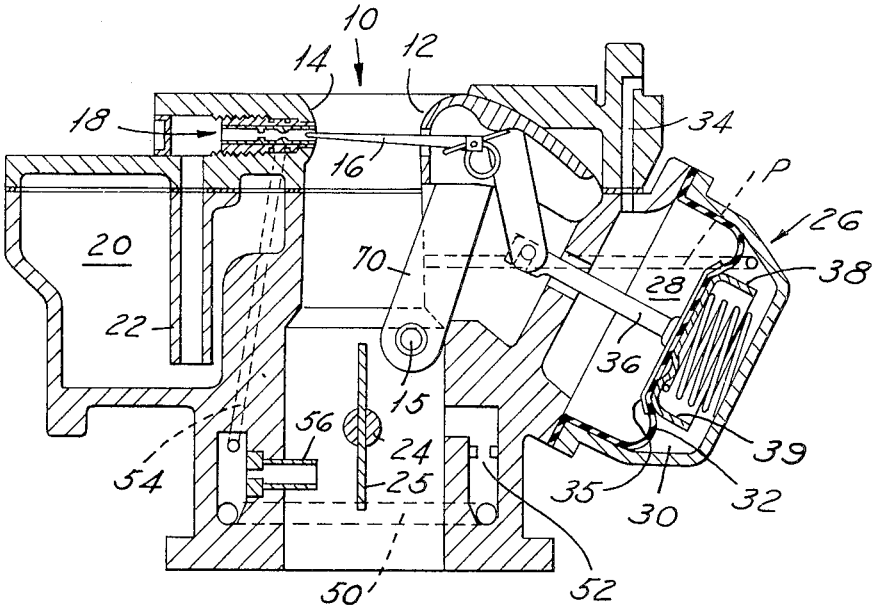
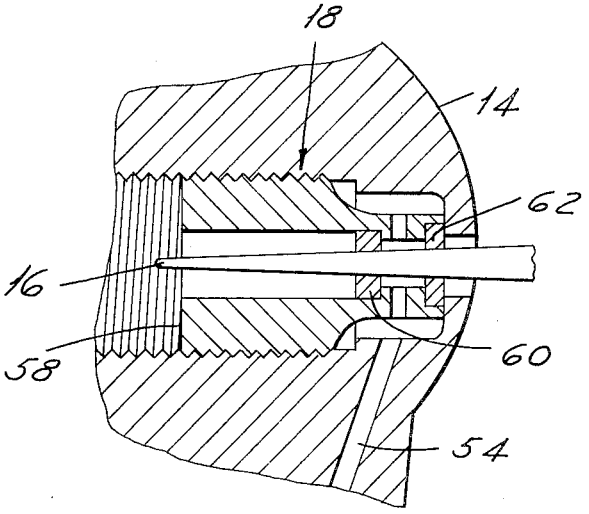
FIG. 3